(12) United States Patent
Lee et al.

(10) Patent No.: US 10,058,755 B2
(45) Date of Patent: Aug. 28, 2018

(54) CURLING ANALYSIS METHOD, AND RECORDING MEDIUM AND DEVICE FOR PERFORMING THE SAME

(71) Applicant: Foundation of Soongsil University-Industry Cooperation, Seoul (KR)

(72) Inventors: Soowon Lee, Seoul (KR); Sung Geon Park, Seoul (KR); Gyohwa Bae, Seoul (KR); Dongxu Jin, Ansan-si (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 326 days.

(21) Appl. No.: 14/892,955

(22) PCT Filed: May 27, 2014

(86) PCT No.: PCT/KR2014/004746
§ 371 (c)(1),
(2) Date: Nov. 20, 2015

(87) PCT Pub. No.: WO2015/126013
PCT Pub. Date: Aug. 27, 2015

(65) Prior Publication Data
US 2016/0121188 A1    May 5, 2016

(30) Foreign Application Priority Data

Feb. 20, 2014   (KR) .................... 10-2014-0019846
May 23, 2014   (KR) .................... 10-2014-0062122

(51) Int. Cl.
*A63F 13/00*    (2014.01)
*A63F 9/24*     (2006.01)
(Continued)

(52) U.S. Cl.
CPC .............. *A63B 67/14* (2013.01); *G06F 17/18* (2013.01); *G06Q 90/00* (2013.01)

(58) Field of Classification Search
CPC .......... A63B 71/06; A63B 67/14; G06F 17/18
See application file for complete search history.

(56) References Cited

U.S. PATENT DOCUMENTS

| 5,412,188 A | * | 5/1995 | Metz | A63B 71/06 |
| | | | | 235/375 |
| 5,779,566 A | * | 7/1998 | Wilens | A63B 69/36 |
| | | | | 473/131 |

(Continued)

FOREIGN PATENT DOCUMENTS

| CN | 103127686 A | 6/2013 |
| KR | 10-2004-0063408 A | 7/2004 |

(Continued)

OTHER PUBLICATIONS

"Rules of Curling for General Play", Canadian Curling Association, Sep. 2007, pp. 1-23.

*Primary Examiner* — Milap Shah
(74) *Attorney, Agent, or Firm* — Novick, Kim & Lee, PLLC; Sang Ho Lee

(57) ABSTRACT

A curling analysis method includes a step of providing a game information input interface for inputting game information in an order of progress of a curling game, a step of outputting analysis information according to the input game information based on stored accumulative curling game information, and a step of visually displaying the output analysis information. Accordingly, an interface that takes into account of convenience of a user is provided and an efficient curling analysis result is provided to assist in improvement of curling performance.

12 Claims, 17 Drawing Sheets

(51) Int. Cl.
    *A63B 67/14*     (2006.01)
    *G06F 17/18*     (2006.01)
    *G06Q 90/00*     (2006.01)

(56) References Cited

U.S. PATENT DOCUMENTS

| | | | |
|---|---|---|---|
| 5,797,796 A | 8/1998 | Dickinson | |
| 6,041,266 A * | 3/2000 | Nickerson | A63B 71/06 273/451 |
| 6,122,559 A * | 9/2000 | Bohn | A63B 71/0669 434/247 |
| 6,148,242 A * | 11/2000 | Descalzi | G06F 15/025 273/148 B |
| 6,603,711 B2 * | 8/2003 | Calace | A63B 71/0605 368/10 |
| 6,795,638 B1 * | 9/2004 | Skelley, Jr. | G11B 27/002 386/200 |
| 7,620,466 B2 * | 11/2009 | Neale | G07F 17/3232 700/91 |
| 2002/0016209 A1 * | 2/2002 | Bates | A63B 71/0672 473/55 |
| 2002/0049507 A1 * | 4/2002 | Hameen-Anttila | H04N 21/25808 700/92 |
| 2003/0204275 A1 * | 10/2003 | Krubeck | A63B 71/06 700/91 |
| 2006/0267286 A1 * | 11/2006 | Hickey | A63B 67/06 273/317 |
| 2007/0265719 A1 * | 11/2007 | Harding | A63B 71/06 700/92 |
| 2007/0300157 A1 * | 12/2007 | Clausi | G06F 3/04883 715/719 |
| 2008/0021651 A1 | 1/2008 | Seeley et al. | |
| 2009/0096593 A1 * | 4/2009 | Dakers | A63B 71/0686 340/323 R |
| 2010/0048187 A1 * | 2/2010 | Sullivan | H04N 21/2187 455/414.3 |
| 2010/0211198 A1 * | 8/2010 | Ressler | G06Q 10/00 700/91 |
| 2012/0064956 A1 * | 3/2012 | Das | A63B 71/0616 463/7 |
| 2014/0288683 A1 * | 9/2014 | Sullivan | H04N 21/2187 700/92 |

FOREIGN PATENT DOCUMENTS

| | | |
|---|---|---|
| KR | 10-2005-0110593 A | 11/2005 |
| KR | 10-0739514 B1 | 7/2007 |
| KR | 10-2010-0051153 A | 5/2010 |
| KR | 10-2011-0040257 A | 4/2011 |
| KR | 10-2011-0046261 A | 5/2011 |
| KR | 10-2012-0019566 A | 3/2012 |
| KR | 10-1213378 B1 | 12/2012 |

* cited by examiner

Number of first and second throw acquisitions for each country (A tournament)

Number of first and second throw acquisitions for each end (South Korea)

Past average acquired and lost point distribution for each country of A tournament Average acquired and lost distribution table for each end Match winning and losing result for each country (A tournament)

| | Germany | USA | Sweden | Switzerland | Scotland | England | Japan | China | Canada | South Korea |
|---|---|---|---|---|---|---|---|---|---|---|
| Germany | – | 19-23 | 30-13 | 20-50 | 23-35 | 11-32 | 43-15 | 34-13 | 11-32 | 5-0 |
| USA | 23-35 | – | 12-32 | 11-32 | 43-15 | 11-32 | 9-40 | 23-35 | 12-32 | 9-40 |
| Sweden | 23-35 | 23-35 | – | 19-23 | 43-20 | 23-35 | 12-32 | 20-13 | 19-23 | 23-35 |
| Switzerland | 12-32 | 20-13 | 23-35 | – | 12-32 | 43-15 | 34-13 | 11-32 | 9-40 | 23-35 |
| Scotland | 11-32 | 19-23 | 23-35 | 23-35 | – | 11-32 | 43-15 | 34-13 | 11-32 | 12-32 |
| England | 43-15 | 20-34 | 12-32 | 23-35 | 23-35 | – | 30-45 | 50-25 | 23-35 | 43-15 |
| Japan | 34-13 | 14-43 | 11-32 | 12-32 | 20-13 | 12-32 | – | 43-15 | 34-13 | 0-3 |
| China | 11-32 | 23-35 | 43-15 | 11-32 | 19-23 | 23-35 | 12-32 | – | 43-15 | 12-33 |
| Canada | 9-40 | 12-32 | 34-13 | 43-15 | 3-45 | 12-32 | 23-35 | 12-32 | – | 11-32 |
| South Korea | 23-35 | 20-13 | 11-32 | 34-13 | 20-13 | 11-32 | 12-32 | 23-35 | 23-35 | – |

Past match record information for each country (A tournament)

|  | Canada | Sweden | England | Switzerland | Japan | Denmark | China | South Korea | Russia | USA |
|---|---|---|---|---|---|---|---|---|---|---|
| Canada |  | 9-3 | 9-6 | 8-5 | 8-6 | 8-5 | 9-2 | 9-4 | 5-3 | 7-6 |
| Sweden | 3-9 |  | 9-4 | 9-8 | 8-4 | 7-6 | 6-7 | 7-4 | 5-4 | 7-6 |
| England | 6-9 | 4-6 |  | 6-8 | 12-3 | 7-8 | 8-7 | 10-8 | 9-6 | 12-3 |
| Switzerland | 5-8 | 8-9 | 8-6 |  | 7-9 | 7-6 | 10-6 | 8-6 | 3-6 | 7-4 |
| Japan | 6-8 | 4-8 | 3-12 | 9-7 |  | 8-3 | 8-5 | 7-12 | 8-4 | 6-8 |
| Denmark | 5-8 | 6-7 | 8-7 | 6-7 | 3-8 |  | 9-6 | 7-4 | 4-7 | 9-2 |
| China | 2-9 | 7-6 | 7-8 | 6-10 | 5-8 | 6-9 |  | 11-3 | 7-5 | 7-4 |
| South Korea | 4-9 | 4-7 | 8-10 | 6-8 | 12-7 | 4-7 | 3-11 |  | 8-4 | 11-2 |
| Russia | 3-5 | 4-5 | 6-9 | 6-3 | 4-8 | 7-4 | 5-7 | 4-8 |  | 9-7 |
| USA | 6-7 | 6-7 | 3-12 | 4-7 | 8-6 | 2-9 | 4-7 | 2-11 | 7-9 |  |

Past match record information for each country in 2013 (A tournament)

FIG. 6I

|  | Germany | USA | Sweden | Scotland | England | Japan | China | Canada | South Korea |
|---|---|---|---|---|---|---|---|---|---|
| First throw | 49 | 48 | 57 | 52 | 60 | 42 | 51 | 70 | 45 |
| Second throw | 53 | 60 | 62 | 60 | 59 | 38 | 52 | 62 | 52 |
| Total | 51 | 54 | 59 | 56 | 59 | 40 | 51 | 66 | 48 |

Win rate according first and second throws in End 1

FIG. 6J

|  | −3 points or less | −2 points | −1 point | 0 point | 1 point | 2 points | 3 points or more |
|---|---|---|---|---|---|---|---|
| Germany | 30 | 42 | 52 | 53 | 55 | 58 | 74 |
| USA | 20 | 28 | 41 | 51 | 54 | 62 | 68 |
| Sweden | 35 | 40 | 50 | 41 | 44 | 55 | 80 |
| Scotland | 38 | 40 | 42 | 52 | 48 | 60 | 72 |
| England | 40 | 35 | 47 | 48 | 55 | 60 | 68 |
| Japan | 25 | 38 | 42 | 62 | 55 | 53 | 58 |
| China | 20 | 40 | 43 | 70 | 49 | 60 | 80 |
| Canada | 41 | 52 | 50 | 75 | 72 | 85 | 94 |
| South Korea | 29 | 62 | 56 | 48 | 62 | 52 | 78 |

Win rate for each country according to accumulative score difference (End 6)

FIG. 6K

CURLING ANALYSIS METHOD, AND RECORDING MEDIUM AND DEVICE FOR PERFORMING THE SAME

CROSS-REFERENCE TO RELATED APPLICATIONS

This application is a national-stage application under 35 U.S.C. § 371 of PCT/KR2014/004746 filed on May 27, 2014, and claims priority to and the benefit of Korean Patent Application Nos. 10-2014-0019846 and 10-2014-0062122, filed on Feb. 20, 2014, and May 23, 2014, respectively, the disclosures of which are hereby incorporated by reference in their entirety.

BACKGROUND

The present disclosure relates to a curling analysis method, and a recording medium and a device for performing this method, and more particularly, to a curling analysis method, and a recording medium and a device for performing this method in which a curling game is analyzed in real time and a result is provided.

Curling is a winter sport in which winning or losing is determined based on how much a "curling stone" slid on ice by both teams is accurately positioned on a predetermined target. The curling is a game played in Scotland since the 16th century, and has been propagated to the United States and Canada and activated by immigrants of Europe. In particular, the curling has been spotlighted as a national sport in Canada, and adopted as an official sport event in the 18th Nagano Winter Olympics, 1998.

Curling is a sport in which physical interaction of bowling or billiards in which a ball is rolled, and features of a Baduk or a chess in which a mental aspect is emphasized are combined, and is a sport event in which mental elements such as a strategies and tactics are important. The curling game is performed between two teams each consisting of four players. In the curling game, when a stone is slid within a rectangular ice rink called a "curling sheet" and put in a house of an opposing team, a score is recognized.

An operation in the curling may be defined as a determination as to how to selectively use which of deliveries. In a broad sense, the operation may be a process of operating a team in an entire game. That is, the operation not only includes recognition of an ice state and selection of a game style and a delivery, but also includes items such as setting of game plans and game evaluation.

Since a player with excellent ability in a game can quickly decide a situation of a game flow and select appropriate technology according to the situation, a variety of operation and skill trainings according to the situation are very important.

The importance of sport data has already been emphasized in professional sport games such as baseball and soccer, and intellectual property rights related to the development of technologies have been filed. However, the development of a real-time curling analysis software which uses IT technology and considers a curling game's winter sports characteristics is deficient. Further, with increase in smart TVs, the development of new sport media content is becoming increasingly important.

In a current international curling game, and Olympics, very limited sport media information such as a past game record, a recent record, and delivery accuracy for each player and each team is utilized in a broadcast. However, such sport media content does not provide professional operation analysis information to players and leaders, and does not provide understanding of sport events and elements of pleasure to people lacking expertise in a curling event.

Further, in an existing recording analysis tool, convenience of a user is not considered and an input scheme is complicated in an order of progress of a game. Accordingly, there is a problem in that additional time according to input of data is required to the user.

Recently, interest in curling has increased due to a participation of the women's national team to Sochi winter Olympics in 2014. A growth rate is expected to be increased before and after Pyeongchang Winter Olympics in 2018. Accordingly, there is a need for an efficient curling analysis device.

SUMMARY OF THE DISCLOSURE

Accordingly, the present disclosure has been made in light of the above-described circumferences, and provides a curling analysis method of providing an intuitive interface for inputting curling data in a form suitable for progress of a game.

Another object of the present disclosure is to provide a recording medium having a computer program recorded thereon to execute the curling analysis method.

Yet another object of the present disclosure is to provide a device for performing the curling analysis method.

A curling analysis method according to an exemplary embodiment for achieving the object of the present disclosure described above includes providing a game information input interface for inputting game information in an order of progress of a curling game, outputting analysis information according to the input game information based on stored accumulative curling game information, and visually displaying the output analysis information.

In an exemplary embodiment of the present disclosure, the providing of the game information input interface may include providing at least one of a game menu (GAME) for inputting game information, a team menu (TEAM) for inputting team information, a delivery menu (DELIVERY) for inputting information on a delivery, and a sheet menu (SHEET) for providing a new layout.

In an exemplary embodiment of the present disclosure, the game menu may provide an input section which is configured to receive game information of at least one of a game name, a game date, and a game time.

In an exemplary embodiment of the present disclosure, the team menu may provide an input section, which is configured to receive game information of at least one of team names of both teams, color of a stone, whether a delivery is a first delivery or not, a gender of a player, and a name of the player.

In an exemplary embodiment of the present disclosure, the delivery menu may provide an input section which is configured to receive game information of at least one of a type of delivery, accuracy of the delivery, and a feature of the delivery.

In an exemplary embodiment of the present disclosure, the outputting of the analysis information includes outputting analysis information of at least one of first and second delivery acquisition, acquired and lost point distribution, type distribution and success rate of deliveries, delivery accuracy for each player and each team, past game record, and a winning rate for each team and each end according to selection of an analysis menu.

In an exemplary embodiment of the present disclosure, the providing of the game information input interface may include providing a curling sheet interface for arranging and moving a curling stone, and providing a button for supporting at least one of a pencil function, an eraser function, and a deletion function on the curling sheet interface.

A computer-readable storage medium according to an exemplary embodiment for achieving another object of the present disclosure described above has a computer program recorded thereon to perform the curling analysis method described above.

A device for performing curling analysis according to an exemplary embodiment for achieving yet another object of the present disclosure described above includes: a data storage unit that stores cumulative curling game information, an interface providing unit that provides a game information input interface for inputting game information in an order of progress of a curling game, a data analysis unit that outputs analysis information according to the input game information based on the cumulative curling game information; and a display unit that displays the game information input interface provided by the interface providing unit, and visually displays the analysis information output from the data analysis unit.

In an exemplary embodiment of the present disclosure, the interface providing unit may provide a new layout when the device is rotated by 90° or more.

The present disclosure relates to curling development analysis for improvement of performance, and it is possible to achieve convenience and ease of a user by designing a UI in the form suitable for progress of the game using a curling data input scheme. Further, it is possible to estimate an operation and a strategy of an opposing team by selecting and storing a function of displaying a rotation direction of the curling stone, and whether the delivery is aggressive or defensive.

Accordingly, as technical effects, it is possible to promote the development of a technology related to winter sports according to the development of a real-time curling analysis system capable of collection, input, storage, output, and retrieval of data in multiple devices, and to develop custom products reflecting characteristics of the sport events and needs of a user. Further, it is possible to contribute to efficiency of a method for real-time analysis of a curling game and improvement of a winning rate through a curling operation analysis (for each player or each team of deliveries).

As to economic effects, it is possible to achieve replacement of purchase of foreign software for curling training, to achieve product commercialization for export of related products, and to contribute to the development of a broadcasting industry due to sale of sport media content.

As to social and cultural effects, it is possible to contribute to improvement of reliability of broadcast by creating media content based on data in sport broadcast, and contribute to successful Pyeongchang Winter Olympics through an increase in public interest in winter sports.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DESCRIPTION OF REFERENCE NUMBERS

Figure 1:
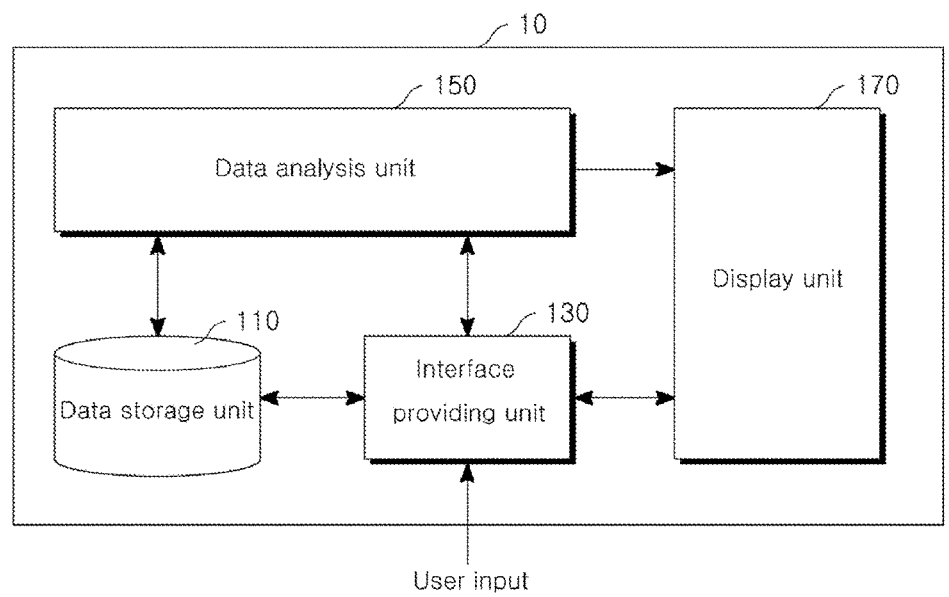
FIG. 1 is a block diagram of a device for performing curling analysis according to an exemplary embodiment of the present disclosure.

10: Device
110: Data storage unit
130: Interface providing unit
150: Data analysis unit
170: Display unit

DETAILED DESCRIPTION OF EXEMPLARY EMBODIMENTS

Detailed description of the present disclosure described below will be described with reference to the accompanying drawings which illustrate specific exemplary embodiments in which the present disclosure may be implemented. The exemplary embodiments will be described in sufficient detail for those skilled in the art to implement the present disclosure. Various exemplary embodiments of the present disclosure are different from each other, but it should be understood that the exemplary embodiments does not need to be mutually exclusive. For example, specific shapes, structures, and properties as described herein may be implemented in other exemplary embodiments without departing from the spirit and scope of the present disclosure in connection with an exemplary embodiment. Further, it should be understood that positions or arrangements of individual components within disclosed exemplary embodiments may be changed without departing from the spirit and scope of the present disclosure. Therefore, detailed description below is not intended to be taken as limited meanings, and the scope of the present disclosure is limited by the claims together with the scope of the claims, if properly described. Like reference numerals in the drawings refer to the same or similar functions throughout the several aspects.

Hereinafter, preferred exemplary embodiments of the present disclosure will be described in more detail with reference to the accompanying drawings.

Figure 2:
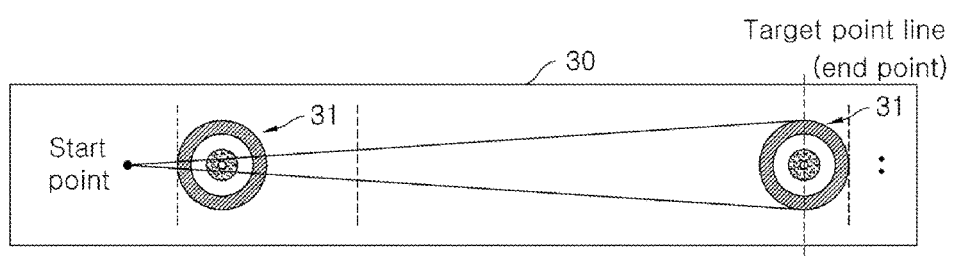
FIG. 2 is a plan view of a curling sheet.

FIG. 1 is a block diagram of a device for performing curling analysis according to an exemplary embodiment of the present disclosure. FIG. 2 is a plan view of a curling sheet.

Referring to FIG. 1, a device 10 for performing curling analysis according to this exemplary embodiment includes a data storage unit 110, an interface providing unit 130, a data analysis unit 150, and a display unit 170 so as to provide an intuitive interface and a real-time analysis result. In the curling game, various data items are generated before the game and during the game.

In the present disclosure, data generated in the curling game may be utilized for enhancement of a player training method, analysis of a strategy and an operation of opposing players and an opposing team, and improvement of performance through analysis of problems of the team.

In the device 10 of the present disclosure, software (application) for curling analysis may be installed and executed. The configurations of the data storage unit 110, the interface providing unit 130, the data analysis part 150, and the display unit 170 may be controlled by the software for curling analysis executed in the device 10. The software for curling analysis can collect, record, store, correct, retrieve, and analyze all of data items derived in the curling game in real time.

Curling refers to a game in which a flat stone is slid on ice by a broom (a comb-like object) to be put in a target so as to acquire a score. In a curling game system, there are two teams each including four players, and a round flat stone called a "curling stone" (hereinafter referred to as a stone) is slid and put in a target of the opposing team called a "house" 31 (see FIG. 2) within a rectangular ice rink called a "curling sheet" (hereinafter referred to as a sheet) 30 (see FIG. 2) having a length of 42.07 m and a width of 4.27 m to acquire a score.

The house includes four circles. The circles have radiuses of 1.83 m, 1.22 m, 0.61 m, and 0.15 m from an outermost circle, and an innermost circle is referred to as a "tee."

A shape of the stone is defined as a circle, and a handle for delivering the stone is fastened by a bolt. In the International curling Club, a weight is defined as 19.96 kg or less, a circumference is defined as 91.44 cm or less, and a height including the handle is defined as 11.43 cm or more.

The device 10 may be a separate terminal or some modules of the terminal. The device 10 may be mobile or fixed. The device 10 may be referred to as a terminal, a user equipment (UE), a mobile station (MS), a mobile terminal (MT), a user terminal (UT), a subscriber station (SS), a wireless device, a personal digital assistant (PDA), a wireless modem, a handheld device, or the like.

The device 10 is a device that supports wired or wireless communication, and may not only include any mobile device such as a smart phone, a mobile phone, a tablet computer, a laptop computer, a netbook computer, a PDA, a PMP, a PSP, an MP3 player, an e-book reader, a navigation, a smart camera, an electronic dictionary, an electronic watch, or a game console, but also an electronic device such as a desktop computer or a smart TV.

The device 10 can execute various applications based on an operation system (OS). The operating system is a system program for enabling the application to use hardware of the device, and may include a mobile computer operating system such as iOS, Android OS, Windows Mobile OS, Bada OS, Symbian OS, or Blackberry OS, and a computer operating system such as Windows series, Linux series, UNIX series, MAC, AIX, or HP-UX.

The application is a program developed to enable a specific task to be performed using the terminal, and may include all of various multimedia content such as games, videos, and photographs as well as various application programs and service objects, and execution programs such as an image viewer or a video player that executes the multimedia content. Hereinafter, an application will be described, but all application programs and executable programs may be included.

Further, the device 10 may display an application or provide a user with a user interface (UI) through the display unit 170.

The display unit 170 may include a liquid crystal display (LCD) panel, a plasma display panel (PDP), an organic light-emitting diode (OLED) display panel, or the like.

Further, in order to process user input, a touch screen function may be included in the display unit 170 or a separate touch pad device may be provided. Alternatively, the device 10 may include an input unit (not illustrated) such as a keypad separately formed from the display unit 170 to receive a user input.

The data storage unit 110 stores cumulative game information that is generated during the curling game. For example, the information may include information such as delivery information according to a situation, a result value, delivery accuracy of each player, and an average score for each end. This information may be stored automatically or manually. The data storage unit 110 may store information on the current game input by the user together with the cumulative curling game information.

The interface providing unit 130 provides a game information input interface for inputting the game information in an order of curling games. The interface may be displayed on the display unit 170 to provide an intuitive interface environment to the user. Hereinafter, the game information input interface will be described in detail with reference to FIGS. 3 to 8.

The data analysis unit 150 outputs analysis information according to the input current game information based on the curling accumulative information. The analysis information may include statistical information derived using the accumulative curling information stored in the data storage unit 110.

The display unit 170 displays the game information input interface provided by the interface providing unit 130, and visually displays the analysis information output from the data analysis unit 150.

Hereinafter, the interface provided in the present disclosure will be described with reference to FIGS. 3 to 8. FIGS. 3 to 7 illustrate illustrative screens showing interfaces provided to input the game information in an order of curling game according to an exemplary embodiment of the present disclosure.

Figure 3:
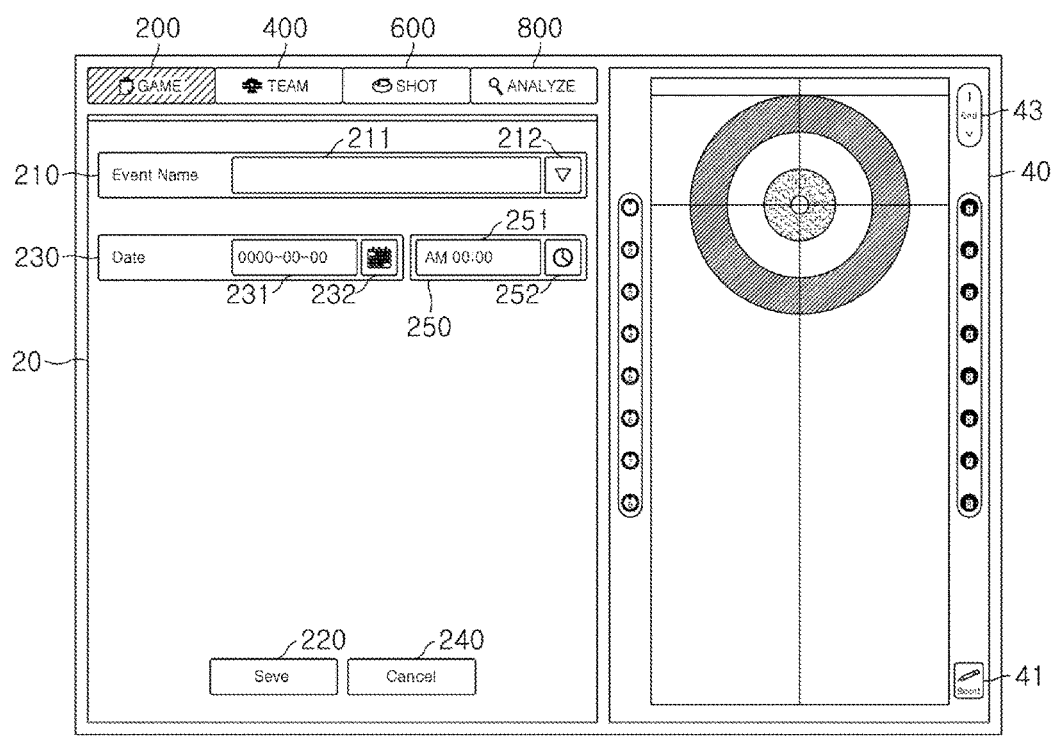
FIGS. 3 to 7 are illustrative screens showing game information input interfaces provided according to an exemplary embodiment of the present disclosure.

Referring to FIG. 3, an illustrative screen of the interface displayed on the display unit 170 according to the present disclosure is illustrated, and the interface providing unit 130 provides a game information input interface 20. Further, the interface providing unit 130 may further provide a curling sheet interface 40 capable of arranging the curling stones.

The game information input interface 20 provides at least one of a game menu (GAME) 200, a team menu (TEAM) 400, a delivery menu (SHOT) 600, and an analysis menu (ANALYZE) 800.

These menus are only examples, and a menu may be added, changed, or deleted, if necessary.

Before the game starts, the user may input a game name, a game date, a game time, or the like in the game menu 200. Specifically, an input section 210 in which the game name can be input is provided. The game name may be directly typed and input to an input window 211 or a previously stored game name may be called and selected by pressing a more view button 212.

If a touch function is included in the display unit 170, the game name may be input to the input window 211 through an input device (input method editor (IME)) that is a virtual soft keyboard.

In an input section 230 in which a game date can be input, a date may be directly typed and input to an input window 231, or a date may be easily selected and input by pressing a calendar button 232. Similarly, in an input section 250 in which a game time can be input, a time may be directly typed and input to an input window 251, or a time may be easily selected and input by pressing a watch button 252. If the user sets a start time once when the game starts, the game time is automatically displayed such that the time can be conveniently confirmed.

After necessary information is input in the game menu 200, a save button (Save) 220 may be pressed to store the information or a cancel button (Cancel) 240 may be pressed to delete the information.

The curling sheet interface 40 is an interface in which a curling stadium is reduced in a plan view and displayed graphically, such that a position of the curling stone can be intuitively recognized.

The curling sheet interface 40 provides a board button 41 for arranging and changing the position of the curling stone. Further, an interface 43 for confirming a current end may be provided.

Figure 4A:
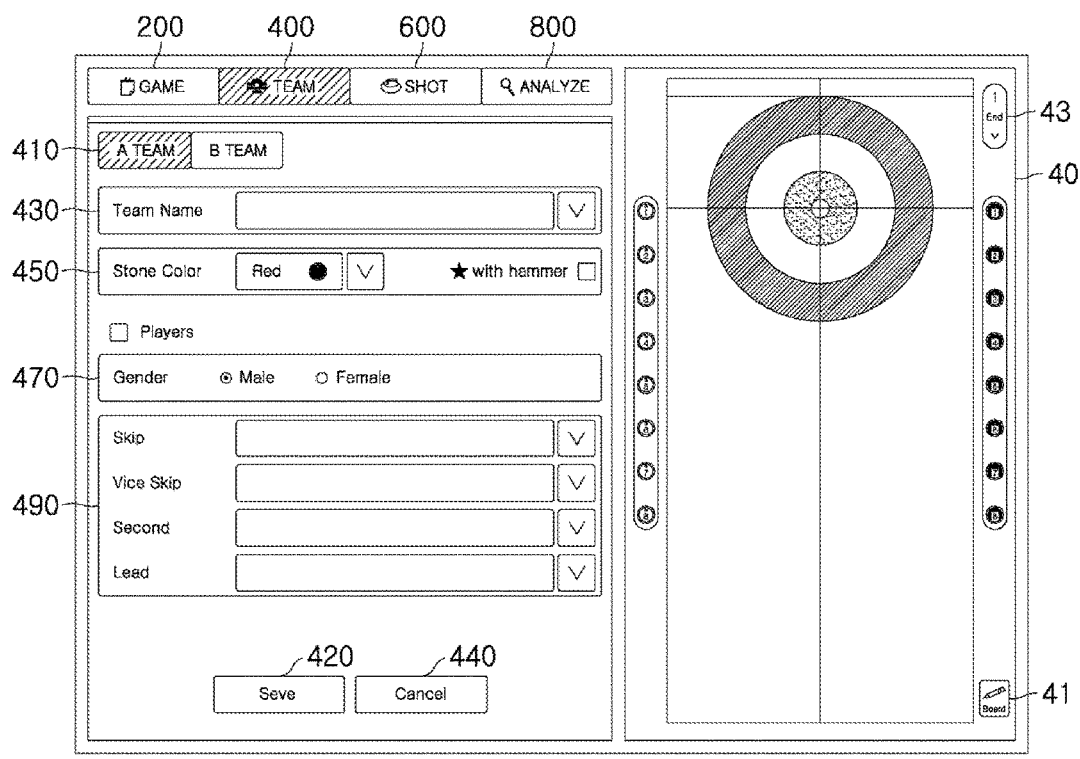

Referring to FIG. 4A, in the team menu 400, team names of the both teams, stone color, which team delivers first, a gender of the player, a name of the player, or the like may be input. The user may input or correct the team and player information before a start of the game or during the game.

Specifically, a button 410 for selecting a team is provided such that the user can select both teams, and an input section 430 in which the team name can be input is provided. The team name may be directly typed and input in an input window, or a previously stored team name may be called and selected through a provided more view button.

Further, a button for selecting color of the stone 450 is provided. A button (with hammer) for checking which team delivers second (with hammer) may also be provided. Further, an input section in which information on the player can be input may also be provided. For example, a button 470 for selecting a gender (male or female) of the player, and an input section 490 in which a player of each position can be input or selected may be provided.

In the curling game, one team includes four players, and positions include lead, second, vice skip (third), and skip. The user may directly input a name of a player to the corresponding position or select the player name. When the game starts, a player in the lead position performs a delivery which determines which team delivers first or second, and accordingly, it is very important to determine the players.

Further, the position of the player can be changed when a request for the change is approved by a referee according to game rules. Since the player position may be changed for each game, the name of the player recorded in the input section 490 displayed in the curling sheet interface can be changed and stored at any time. For example, after a player A plays a game in a lead position in a first round of the game, the player may play the game in a skip position in a second round of the game.

Figure 4B:
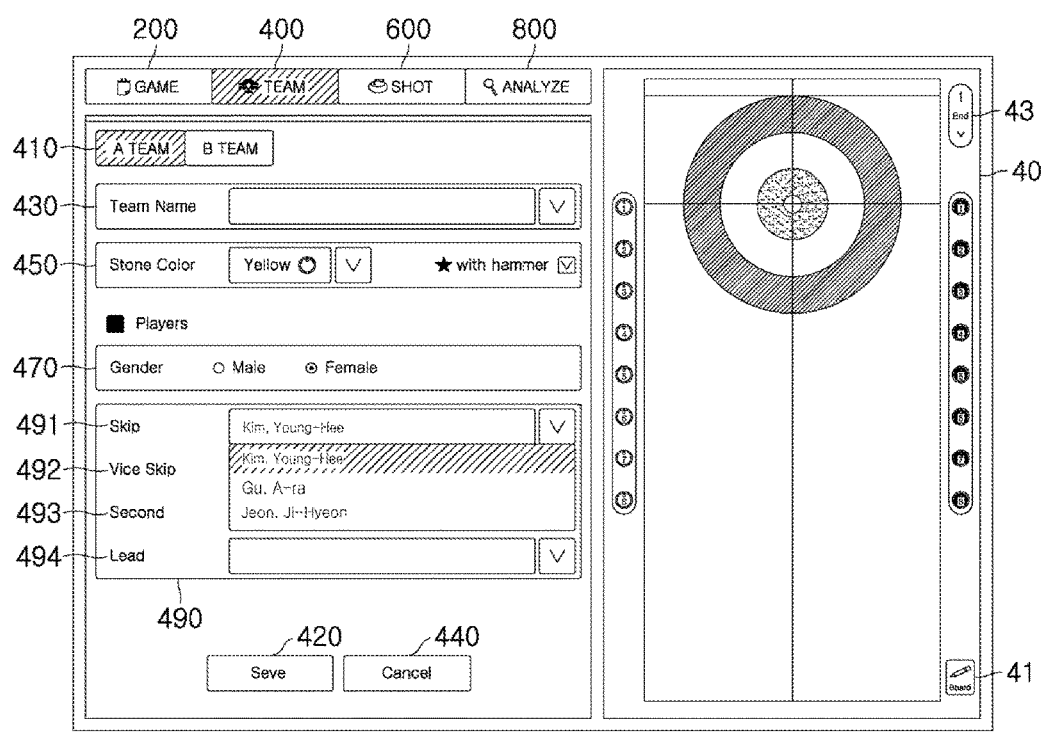

Referring to FIG. 4B, an example in which a player for each position is selected and input is illustrated. After necessary information is input in the team menu 400, a save button (Save) 420 may be pressed to store the information or a cancel button (Cancel) 440 may be pressed to delete the information.

Figure 5A:
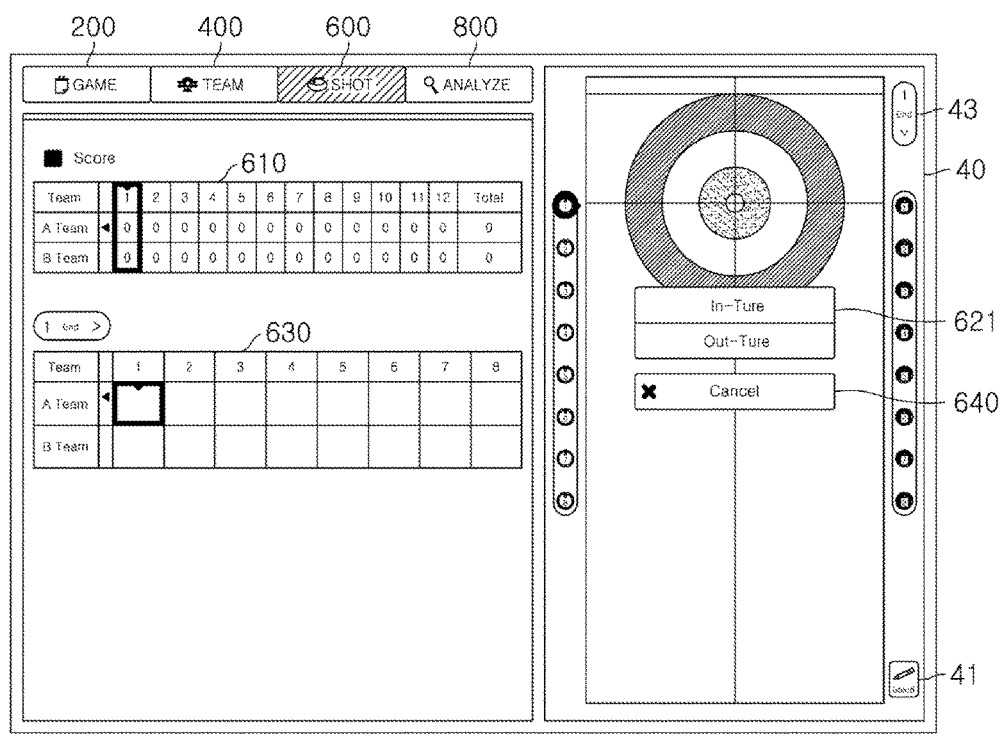

Referring to FIG. 5A, information on a delivery may be input in a delivery menu 600.

The user may input the delivery information of the team in the end according to a game situation during the game. In this case, a score sheet 610 in which a current score is described for each team and each end may be displayed according to the progress of the game.

First, the stone of the delivery to be currently recorded is displayed in the curling sheet interface 40, and when the displayed stone is selected, a pop-up window 621 for inputting delivery information may be displayed. In the pop-up window 621, it can be selected whether the delivery is In-Turn or Out-Turn.

Further, a pop-up window for inputting other delivery information may be displayed sequentially, in an arbitrary order, or simultaneously. In this case, a cancel button (Cancel) 640 is provided, and when this cancel button is selected, the pop-up window 621 for inputting delivery information may be closed.

Figure 5B:
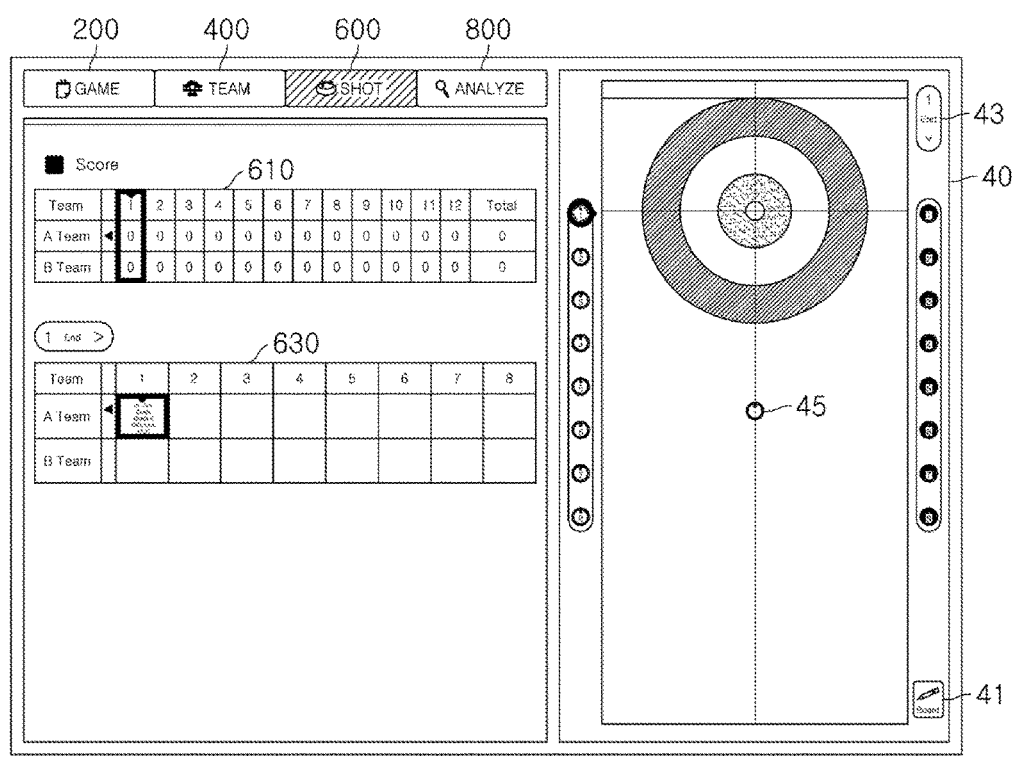

Referring to FIG. 5B, when the stone 45 displayed in the curling sheet interface 40 is selected, information on the stone may be input, and the position of the stone may be changed until the stone of the next delivery is selected. When the user desires to view a situation of a previous delivery again or to correct the information and presses a position in which the stone of the previous delivery has laid, the screen is moved to a screen showing the information of the previous delivery while a stone indication being moved. Further, if the information on the stone is desired to be corrected and the stone is selected, a delivery information correction pop-up window is displayed. When a correction button for the information is desired to be corrected, a corresponding information correction pop-up window is displayed (see FIG. 5C). When the stone 45 is dragged, the position may also be changed.

An information table 630 including information on a current delivery for each team and each end is displayed in the game information input interface 20 such that the user can confirm the input information.

Figure 5C:
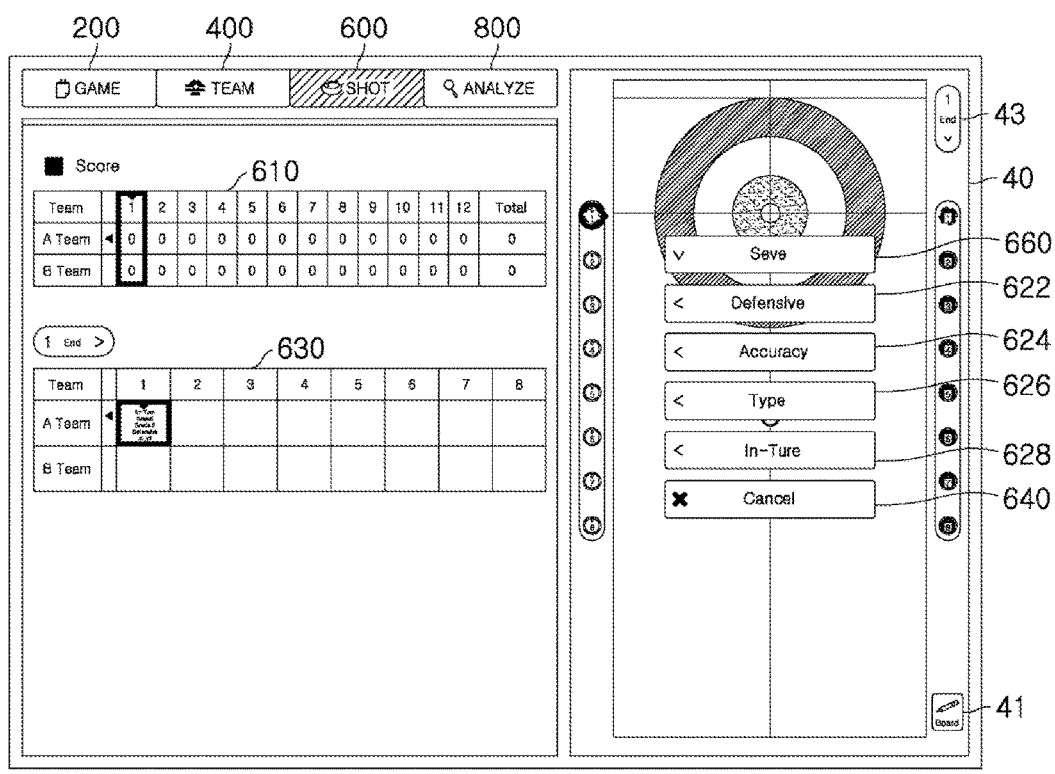

Referring to FIG. 5C, buttons 622, 624, 626, and 628 for inputting the information on the delivery are illustrated. For example, a button 622 for inputting a feature of the delivery may be provided. In this case, it can be selected whether the delivery is aggressive or defensive. After the delivery, a button 624 for inputting accuracy of the delivery may be provided. In this case, a grade may be selected according to the accuracy of the delivery.

Further, a button 626 for inputting a feature of the delivery may be provided. In this case, a delivery type (Draw, Front, Guard, Raise, Wick/Soft peeling, Freeze, Take-out, Hit & Roll, Clearing, Double Take-out, the Promotion Take-out, or the like) may be selected. For example, the guard is a skill of causing a stone to stop in front of a stone in the house so as to protect the stone in the house, and the draw is a skill of causing the stone to stop in a fixed position of the house.

Further, a button 628 for inputting a turn direction of the stone may be provided. In this case, it may be selected whether the delivery is In-Turn (clockwise) or Out-Turn (counterclockwise). For the respective buttons 622, 624, 626, and 628, a correction button for returning to a previous step may be provided for correction together.

The input information may be reflected in an information table 630 in which information on a current delivery is described for each team and each end, and may be confirmed. If necessary information is input, the information may be stored by pressing the save button 660 or deleted by pressing the cancel button 640.

Figure 6A:
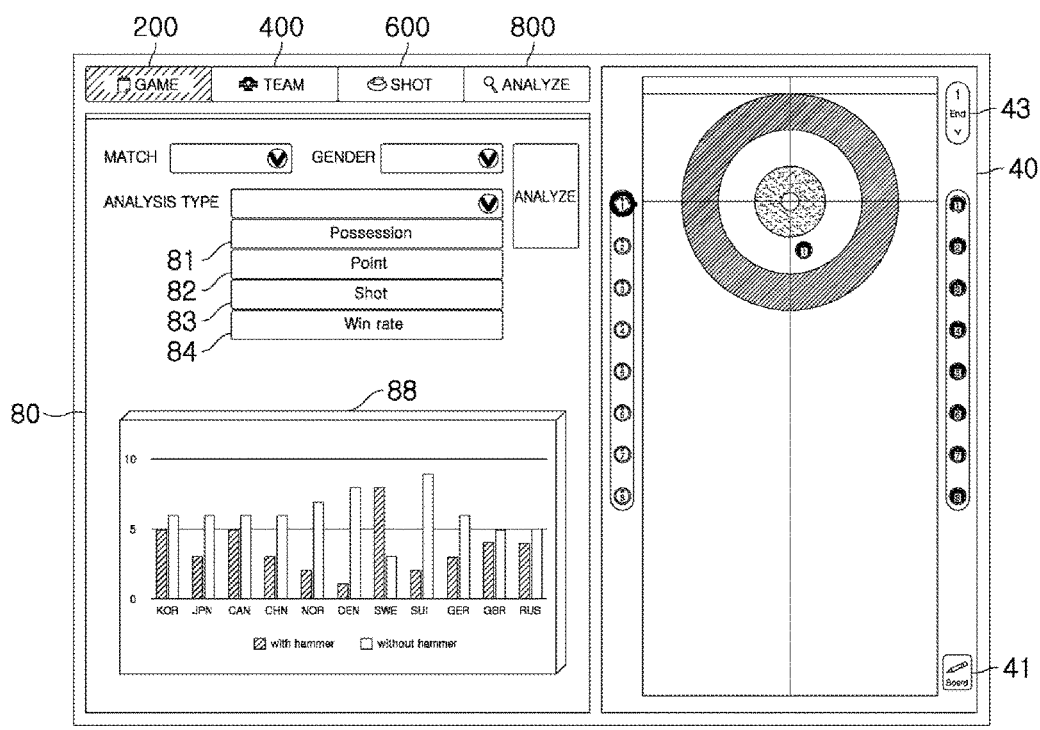

Referring to FIG. 6A, after information necessary for a game is input, the user may select the analysis menu 800. In this case, analysis information 80 according to the input game information is visually displayed. For example, the analysis information 80 may be displayed as an intuitively recognizable graphic element 88, such as a chart distribution table, a histogram, or a bar graph.

Specifically, when the analysis menu 800 is selected, an interface for selecting a game information menu (game), a gender menu (gender), and a data analysis type menu (analysis type) is displayed. The data analysis type menu (analysis type) may provide information such as stone acquisition information (Possession), point (Point), delivery (Shot), a winning rate (Winning rate), delivery accuracy for each player and each team (Shot Accuracy), game record information (Matching), and the provided information may provide game information of a tournament occurred during a period of time.

For example, categories 81, 82, 83, and 84 in which the data analysis type can be selected are provided. When the user selects the desired type of analysis information, the analysis information may be displayed as a graphical element 88.

Figure 6B:
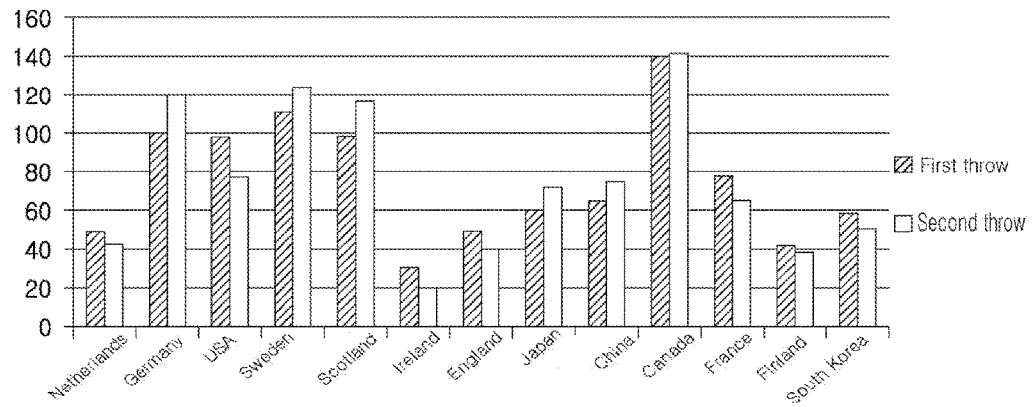

Referring to FIG. 6B, when the stone acquisition information category (Possession) 81 is selected, the first and second delivery analysis information for a team stored in the data storage unit 110 is provided, and the provided information is game information on the first and second deliveries of games performed by each team based on total games in a tournament for a certain period of time. The curling game is a winter sport in which, among two teams, the team acquiring a higher score than that of the opposing team using a tool in given time wins. The curling game has a characteristic that physical collision between the stone and the stone has direct influence on a game result. Therefore, an order of progress of the game is very important. First use of the stone before the opposing team is defined as the first delivery, and progress after the opposing team deliveries is defined as the second delivery. In the stone acquisition information category 81, it may be presented whether the team performs the first delivery or the second delivery in total games for each team (country) using a frequency distribution table or a bar graph, to provide the statistical information.

Figure 6C:
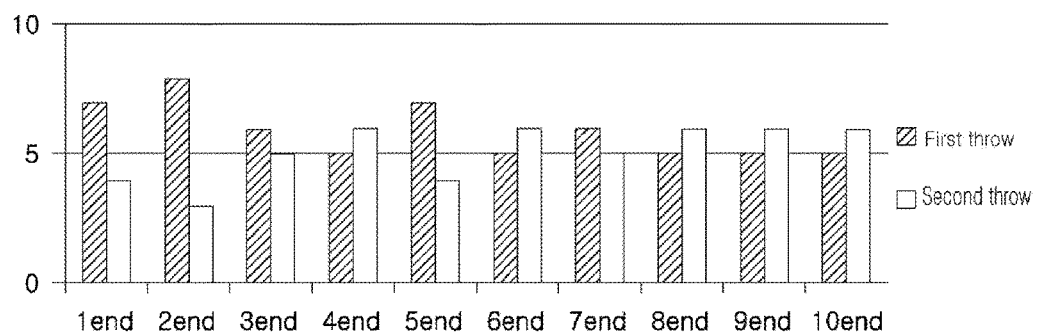

Referring to FIG. 6C, when a specific team (country) illustrated in FIG. 6B is selected, first and second delivery analysis information for each end is displayed in a bar graph.

Figure 6D:
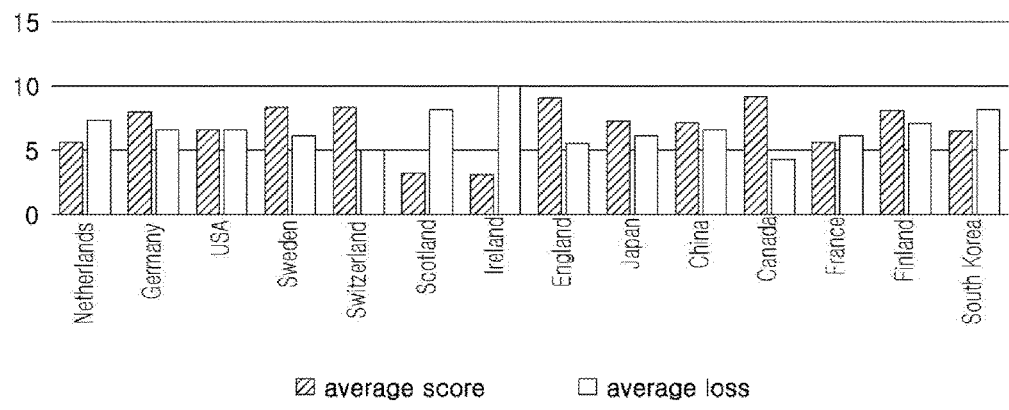
Figure 6E:
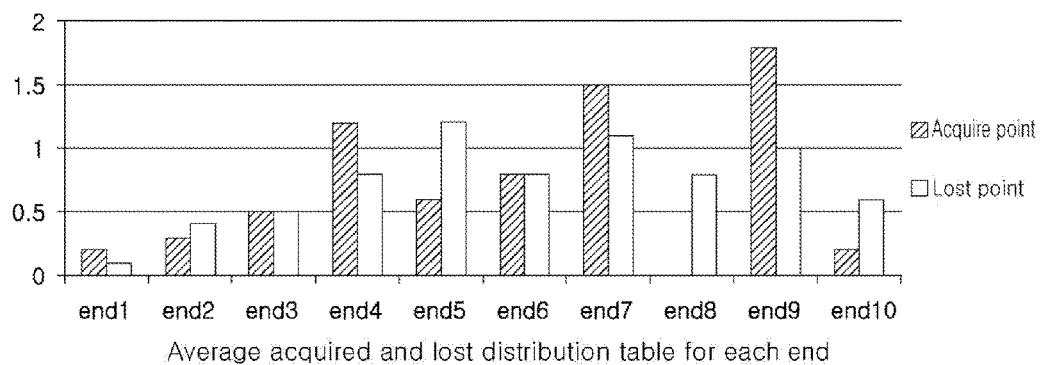

Referring to FIG. 6D, when a point category 82 is selected, the average acquired point and lost point in an A game of the team or the country stored in the data storage unit 110 is provided. Further, as illustrated in FIG. 6E, when the team is selected, an average acquired and lost point distribution information for each end in the tournament for the selected team is presented. Thus, acquired and lost point pattern information of the team to be analyzed can be provided.

Figure 6F:
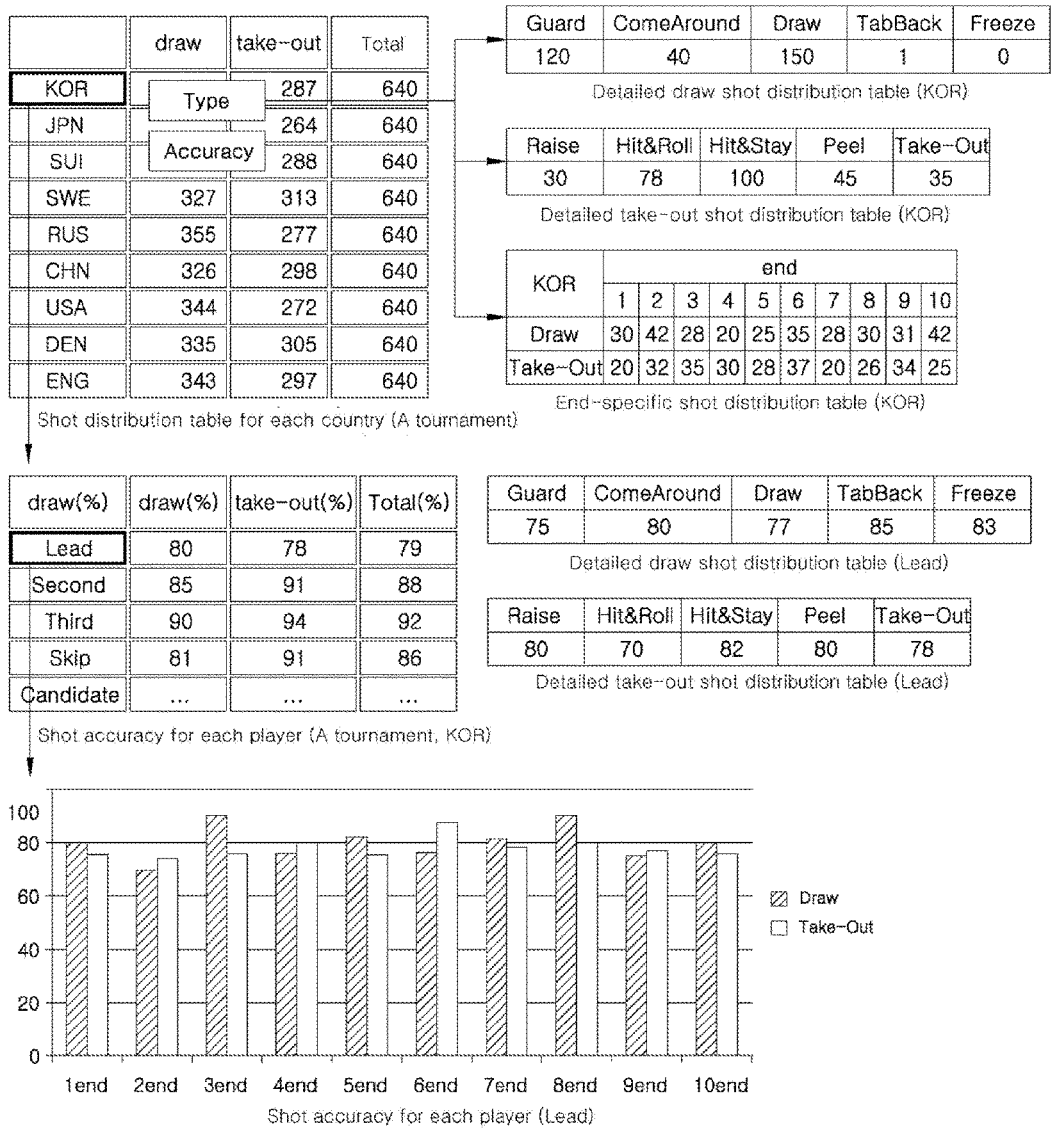

Referring to FIG. 6F, a delivery category 83 provides statistical information for the type of the delivery for each team stored in the data storage unit 110. The delivery of the curling is greatly classified into draw take-out, and the draw and take-out deliveries may be subdivided into several deliveries. The type of deliveries is a key element for recognizing the operation of the team, and may be utilized as information. Analysis information that may be presented is statistical information corresponding to technical statistics such as a frequency distribution table, a histogram, or a bar graph.

In FIG. 6F, information on a distribution, a type, and accuracy of deliveries for each country (team) is displayed. When a team name illustrated in FIG. 6F is selected, information on the type and the accuracy of the delivery for each team or the type and the accuracy of the delivery of the player may be displayed. The type and the accuracy of the delivery are very important elements when a leader of the team establishes an operation and a strategy. When the team has more players who receive an operation instruction holding an ability to accurately perform the delivery toward a planned place, the team has high competitiveness. Further, if the delivery widely used in the game can be recognized, an operation and a strategy suitable for a strategy of the opposing team can be established. Therefore, the performance for deliveries may be evaluated based on players and teams, and information expressed by, for example, a circular or radial diagram may be provided to the user.

Figures 6G, 6H:
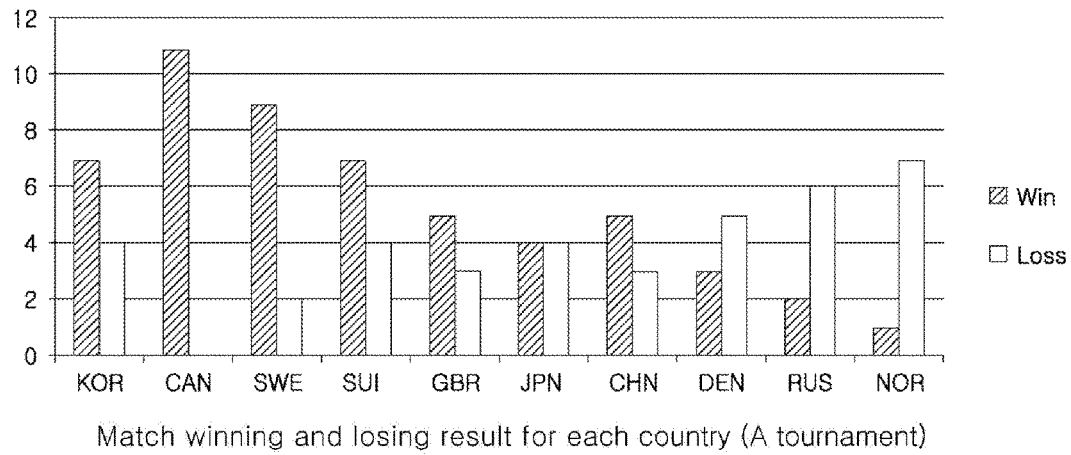

Referring to FIGS. 6G, 6H, 6I, 6J, and 6K, a winning rate category 84 may provide a past tournament winning and losing distribution of a team, a conditional winning rate (for example, a winning rate according to first and second deliveries in one end or a winning rate according to a cumulative point difference), and past game record information (see FIG. 6H) stored in the data storage unit 110. When a graph illustrated in FIG. 6G is selected, a pop-up window for each year of an A tournament stored in a DB is generated. In the generated pop-up window, a selection window in which information for each year of the A tournament can be selected is given, and when a specific year (for example, 2013) is selected, game winning and losing result information for each country for the A tournament of the year is provided. When a mouse is right-clicked on a graph illustrated in FIG. 6G, a pop-up window in which past game record information can be selected is generated, and when the past game record information is selected, the past game record information for winning (left number)-losing (right number) is provided to the user. Further, when the game record information in FIG. 6H is clicked, a pop-up window in which game record information for a specific year can be selected is generated, and when this information is selected, game record information for each country for a specific year in a specific tournament is provided, as illustrated in FIG. 6I.

In FIG. 6J, winning rate information according to first delivery and second delivery in End 1 is provided. In FIG. 6K, winning rate information for each country according to the cumulative score difference is provided (for example, winning rate comparison for each country according to the cumulative score difference after End 6 ends) is provided. In the curling game, a highest score in one end can be acquired when all of eight stones enter the house, and all of stones of the opposing team are outside the house, which is impossible in terms of characteristics of the game. Accordingly, since the score difference in the current period of time is very important information, the information on the cumulative score difference for each end may be used as being significant in the game.

Figure 7:
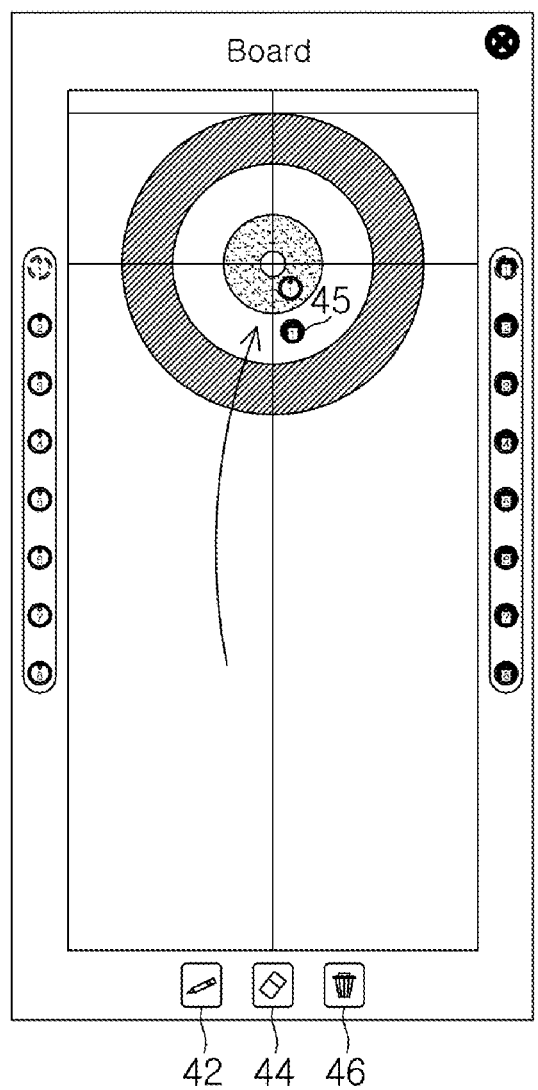

The type of the data analysis described above is only an example, and the type may be added, changed, and deleted, if necessary. Referring to FIG. 7, a case in which the board button 41 is selected in the curling sheet interface 40 is illustrated. The curling stone 45 may be arranged and changed, and a pencil button 42, an eraser button 44, and a deletion button 46 are provided.

Accordingly, the user may explain the strategy so that the strategy is intuitively recognizable using the curling stone 45, the pencil button 42, the eraser button 44, the deletion button 46, or the like.

Figure 8:
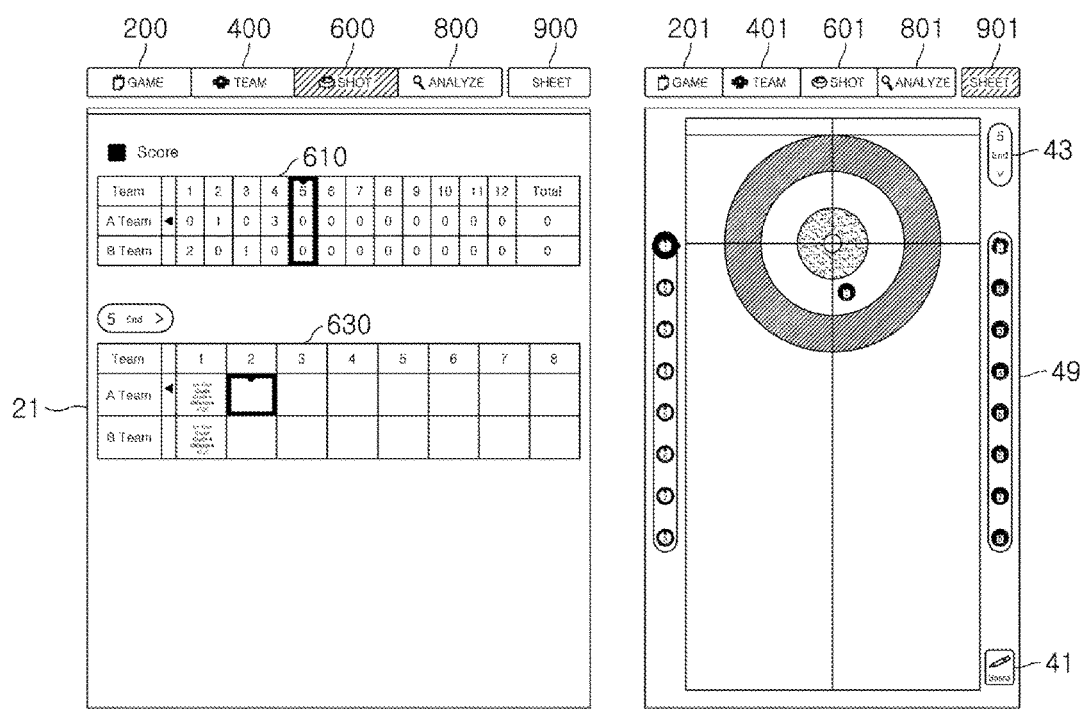
FIG. 8 is an illustrative screen showing a game information input interface provided according to another exemplary embodiment of the present disclosure.

FIG. 8 is an illustrative screen showing a game information input interface provided according to another exemplary embodiment of the present disclosure.

In this exemplary embodiment, the game information input interface 21 provides at least one of a game button (GAME) 200, a team menu (TEAM) 400, a delivery menu (SHOT) 600, an analysis button (ANALYZE) 800, and a sheet menu (SHEET) 900. The game menu 200, the team menu 400, the delivery menu 600, and the analysis menu 800 have substantially the same configurations as that described in FIGS. 3 to 7.

In this exemplary embodiment, a sheet menu 900 may be further included, unlike the exemplary embodiment of FIGS. 3 to 7. When the sheet menu 900 is selected, the layout is changed into a new layout. For example, when the user viewing the display unit 170 in a horizontal direction selects the sheet menu 900, the screen displayed on the display unit 170 is switched to a vertical direction.

Further, a curling sheet interface 49 may provide at least one of a game menu (GAME) 201, a team menu (TEAM) 401, a delivery menu (SHOT) 601, an analysis button (ANALYZE) 801, and a sheet menu (SHEET) 901, and the user may access the menu through the curling sheet interface 49.

Thus, the user may select a sheet menu 901 displayed in the curling sheet interface 49 such that a new layout can be displayed.

In another example, when the device 10 is rotated by 90° or more, the layout may be changed into a new layout. For example, when the user using the device 10 in the horizontal direction rotates the device 10 so as to vertically view the device 10, the screen displayed on the display unit 170 is also switched to the vertical direction. This screen switching may be provided in a variety of forms according to convenience of the user.

Figure 9:
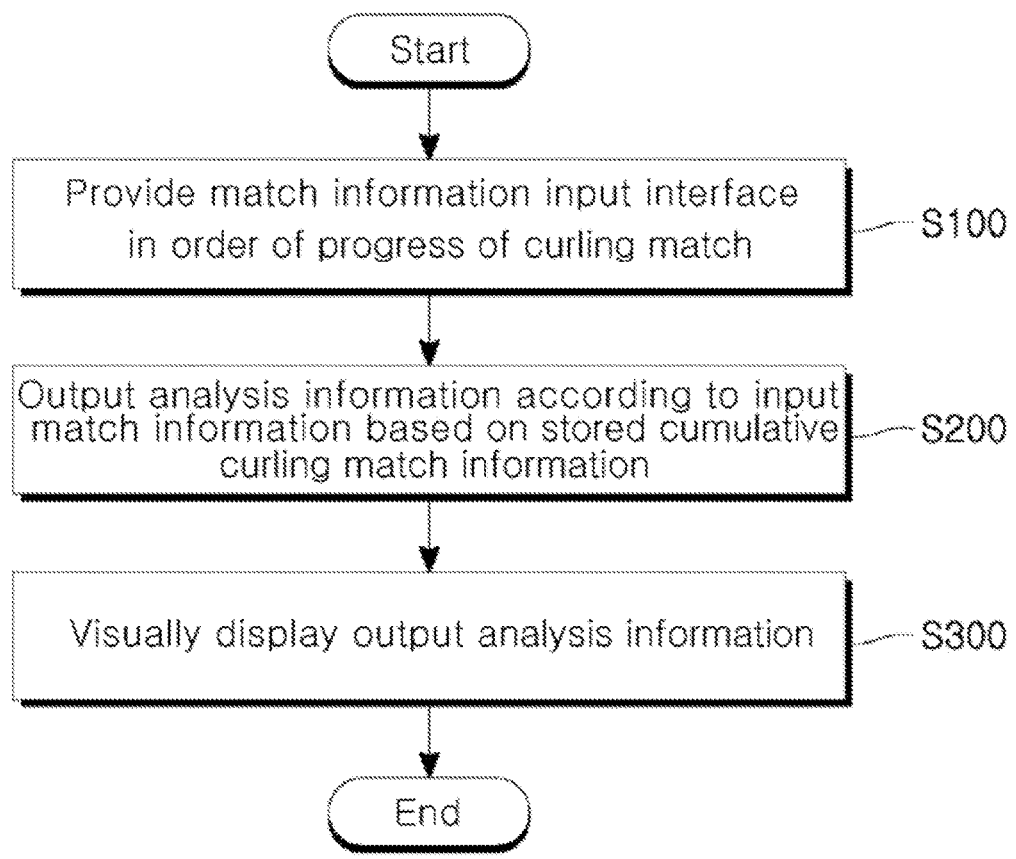
FIG. 9 is a flowchart of a curling analyzing method according to an exemplary embodiment of the present disclosure.

According to the present disclosure, the user may be provided with an interface that is intuitive and convenient for an input in consideration of user convenience, and input various pieces of game information in an order of progress of the game through the interface. Accordingly, the user can save time and effort for inputting the game information, receive a curling analysis result during the game in real time, and estimate an operation and a strategy of the opposing team. FIG. 9 is a flowchart of a curling analyzing method according to an exemplary embodiment of the present disclosure.

The curling analysis method according to this exemplary embodiment may be executed in substantially the same configuration as that of the device 10 of FIG. 1. Therefore, the same components as those of the device 10 in FIG. 1 are denoted with the same reference numerals, and repeated description will be omitted.

Alternatively, the curling analysis method according to this exemplary embodiment may be executed by software (application) for curling analysis.

Referring to FIG. 9, in the curling analysis method of this exemplary embodiment, a game information input interface for inputting the game information in an order of progress of the curling game is provided (step S100).

In a step of providing the game information input interface (step S100), at least one of a game menu (GAME), a team menu (TEAM), a delivery menu (SHOT), an analysis menu (ANALYZE), and a sheet menu (SHEET) may be provided.

The game menu may provide an input section in which game information of at least one of game mane, a game date, and a game time can be input, and the team menu may provide an input section in which team information of at least one of team names of both teams, stone color, whether delivery is a first delivery, a gender of a player, and a name of the player can be input. Further, the delivery menu may provide an input section in which delivery information of at least one of a type, accuracy, and feature of the delivery can be input.

In each menu, the user can directly input information or may select relevant information from among the respective pieces of information and input the information. A saving button (Save) for inputting and storing each piece of information and a cancel button (Cancel) for deleting the information may be provided together.

Further, in a step of providing the game information input interface (step S100), a curling sheet interface for arranging the curling stones is provided, and a button for supporting at least one of a pencil function, an eraser function, and a deletion function may be provided on the curling sheet interface.

After the user inputs necessary game information and then selects ANALYZE, analysis information according to the input game information is output based on the stored cumulative curling game information (step S200).

In a step of outputting the analysis information (step S200), information such as first and second delivery acquisition (Possession), acquired and lost point distribution (Point Distribution), type distribution and success rate of the delivery (Shot type statistics), delivery accuracy for each player and each team (Shot Accuracy), a past game record (Matching), a winning rate for each team and each end (Winning rate), and probability (Probability) may be output.

Since the output analysis information is visually displayed (step S300), the user can intuitively recognize a game situation, and predict a flow of the game.

This method of performing a curling simulation may be implemented by an application or implemented in the form of program instructions that can be executed through various computer components, and may be recorded in a computer-readable recording medium. The computer-readable recording medium may include program instructions, data files, data structures, and the like alone and in combination.

Program instructions recorded on the computer-readable recording medium may be program instructions particularly designed and configured for the present disclosure or may be program instructions known and available to those skilled in the art in the computer software field.

Examples of the computer-readable recording medium may be a hardware device particularly configured to store and execute program instructions, such as a magnetic medium such as a hard disk, a floppy disk, or a magnetic tape, an optical recording medium such as a CD-ROM or a DVD, a magneto-optical medium such as a floptical disk, a ROM, a RAM, and a flash memory.

Examples of the program instructions not only include machine code as created by a compiler, but also, include higher level code that can be executed by a computer using an interpreter or the like. The hardware device may be configured to operate as one or more software modules so as to perform the process according to the present disclosure, and vice versa.

While the present disclosure has been described above with reference to the exemplary embodiments, it will be understood by those skilled in the art that that various modifications and changes can be made to the present disclosure without departing from the spirit or scope of the disclosure defined in the claims.

The curling analysis method, and the recording medium and the device for performing the method according to the present disclosure can provide a real-time curling game analysis system and sport media content using the system, and can contribute to new content development in the field of elite sports and life sports, an increase in interest in unpopular winter sport events through providing of new content to viewers, and securing of the diversity of content when the method, the medium, and the device are utilized in winter sport broadcast.

Further, based on these results, ripple effects such as 1) contribution to the development of an industry of winter sports according to the development of a real-time curling analysis technology capable of collection, input, storage, output, and search of data in multiple devices, 2) contribution to a science of sports through objective evaluation based on data, 3) improvement of a statistical method and algorithm suitable for curling analysis, 4) diversification of broadcast content according to the development of new media content, and 5) contribution to national support for contributing to successful Pyeongchang Winter Olympics can be expected.

Moreover, beyond the utilization of curling analysis for training and a game, the present disclosure can be applied to a curling simulation, a mobile curling game, an online curling game, broadcast content of a curling game, a virtual curling training field, or the like, and can be applied to various fields such as other sport events (for example, soccer or baseball).

What is claimed is:

1. A curling analysis method comprising:
   providing a game information input interface on a display device coupled to a computing device, the game information input interface configured to receive game information in an order of progress of a curling game, wherein the curling game comprises at least one player of at least one team of a plurality of teams physically moving at least one of a plurality of curling stones across a playing surface from a first team end toward a second team end;
   cumulatively storing, in a storage device coupled to the computing device, the game information input in the order of progress of the curling game;
   outputting analysis information according to an analysis performed by the computing device of the cumulatively stored game information input via the game information input interface; and
   displaying, by the display device, the analysis information,
   wherein the outputting includes outputting analysis information comprising at least one of first and second delivery acquisition, acquired and lost point distribution, type distribution and success rate of deliveries, delivery accuracy for each player and each team, past game record, and a winning rate for each team and each team end according to selection of an analysis menu displayed by the display device, and
   wherein the providing includes providing a curling sheet interface on the display device for arranging and moving at least one of the plurality of curling stones as icons on a sheet at positions representing physical positions on the playing surface, and providing a button for supporting at least one of a pencil function, an eraser function, and a deletion function on the curling sheet interface.

2. The curling analysis method of claim 1, wherein the providing includes providing at least one of a game menu for inputting the game information, a team menu for inputting team information, a delivery menu for inputting information on a delivery, and a sheet menu for providing a new layout.

3. The curling analysis method of claim 2, wherein the game menu provides an input section that receives the game information comprising at least one of a game name, a game date, and a game time.

4. The curling analysis method of claim 2, wherein the team menu provides an input section that receives the game information comprising at least one of team names of the plurality of teams, color of a stone, whether a delivery is a first delivery or not, a gender of a player, and a name of the player.

5. The curling analysis method of claim 2, wherein the delivery menu provides an input section that receives the game information comprising at least one of a type of delivery, accuracy of the delivery, and a feature of the delivery.

6. A non-transitory computer-readable recording medium having a computer program stored thereon, which when executed by a computing device, causes the computing device to perform a curling analysis method, the method comprising:
   providing a game information input interface on a display device coupled the computing device, the game information input interface configured to receive game information in an order of progress of a curling game, wherein the curling game comprises at least one player of at least one team of a plurality of teams physically moving at least one of a plurality of curling stones across a playing surface from a first team end toward a second team end;
   cumulatively storing, in the non-transitory computer-readable recording medium, the game information input in the order of progress of the curling game;
   outputting analysis information according to an analysis performed by the computing device of the cumulatively stored game information input via the game information input interface; and
   displaying, by the display device, the analysis information,
   wherein the outputting includes outputting analysis information comprising at least one of first and second delivery acquisition, acquired and lost point distribution, type distribution and success rate of deliveries, delivery accuracy for each player and each team, past game record, and a winning rate for each team and each team end according to selection of an analysis menu displayed by the display device, and
   wherein the providing includes providing a curling sheet interface on the display device for arranging and moving at least one of the plurality of curling stones as icons on a sheet at positions representing physical positions on the playing surface, and providing a button for supporting at least one of a pencil function, an eraser function, and a deletion function on the curling sheet interface.

7. The non-transitory computer-readable recording medium of claim 6, wherein the providing includes providing at least one of a game menu for inputting the game information, a team menu for inputting team information, a delivery menu for inputting information on a delivery, and a sheet menu for providing a new layout.

8. The non-transitory computer-readable recording medium of claim 7, wherein the game menu provides an input section that receives the game information comprising at least one of a game name, a game date, and a game time.

9. The non-transitory computer-readable recording medium of claim 7, wherein the team menu provides an input section that receives the game information comprising at least one of team names of the plurality of teams, color of a stone, whether a delivery is a first delivery or not, a gender of a player, and a name of the player.

10. The non-transitory computer-readable recording medium of claim 7, wherein the delivery menu provides an input section that receives the game information comprising at least one of a type of delivery, accuracy of the delivery, and a feature of the delivery.

11. A mobile computing device configured to perform curling analysis, the mobile computing device comprising:
a display device;
a data storage device; and
a processor configured to perform the steps of:
providing a game information input interface on the display device, the game information input interface configured to receive game information in an order of progress of a curling game, wherein the curling game comprises at least one player of at least one team of a plurality of teams physical moving at least one of a plurality of curling stones across a playing surface from a first team end toward a second team end;
cumulatively storing, in the data storage device, the game information input in the order of progress of the curling game;
outputting analysis information according to an analysis performed by the processor of the cumulatively stored game information input via the game information input interface; and
displaying, by the display device, the analysis information,
wherein the outputting analysis information comprises at least one of first and second delivery acquisition, acquired and lost point distribution, type distribution and success rate of deliveries, delivery accuracy for each player and each team, past game record, and a winning rate for each team and each team end according to selection of an analysis menu displayed by the display device, and
wherein the providing includes providing a curling sheet interface on the display device for arranging and moving at least one of the plurality of curling stones as icons on a sheet at positions representing physical positions on the playing surface, and providing a button for supporting at least one of a pencil function, an eraser function, and a deletion function on the curling sheet interface.

12. The device according to claim 11, wherein a new layout is provided on the display device when the mobile computing device is rotated by 90° or more.

* * * * *